United States Patent [19]
Hildebrandt et al.

[11] Patent Number: 5,943,100
[45] Date of Patent: Aug. 24, 1999

[54] CIRCUIT ARRANGEMENT FOR FREQUENCY CONVERSION OF A COLOR SIGNAL

[75] Inventors: Günter Hildebrandt, Buxtehude; Herbert Heinemann, Pinneberg, both of Germany

[73] Assignee: U.S. Philips Corporation, New York, N.Y.

[21] Appl. No.: 08/887,972

[22] Filed: Jul. 3, 1997

[30]     Foreign Application Priority Data

Jul. 18, 1996 [DE] Germany .................. 196 28 996

[51] Int. Cl.⁶ .................. H04N 7/01; H04N 11/20
[52] U.S. Cl. ............................. 348/453; 348/457
[58] Field of Search ................. 348/454, 453, 348/457, 493, 554, 555, 557, 654, 640, 641; H04N 7/01, 11/20, 9/42

[56]         References Cited

U.S. PATENT DOCUMENTS

| | | | |
|---|---|---|---|
| 4,314,273 | 2/1982 | Amery ......................... | 348/454 |
| 4,568,963 | 2/1986 | Sakai et al. ................... | 348/454 |
| 4,573,086 | 2/1986 | Sakai et al. ................... | 348/454 |

*Primary Examiner*—Michael H. Lee
*Attorney, Agent, or Firm*—Edward W. Goodman

[57]               ABSTRACT

For purposes of simple construction and universal application, a circuit arrangement for frequency conversion of a color signal to a second carrier frequency, this color signal being present in picture lines and including a color burst and a chrominance information signal modulated on a chrominance sub-carrier of the first carrier frequency, the circuit arrangement being switchable in a mode for conjugate-complex formation in which it generates an output signal in which, additionally to the frequency conversion, the color signal has a phase position in accordance with the PAL standard, which alternates from picture line to picture line, and which color signal is present in a conjugate-complex form in every second picture line, is characterized in that the color signal modulated on the first carrier frequency is converted to a third carrier frequency by a first mixer (1), this third carrier frequency being higher than the first and lower than the second carrier frequency, a second mixer (20) is provided by which the color signal having the third carrier frequency is converted to the second carrier frequency, the second mixer receives a second mixing signal during the periods when the conjugate-complex formation mode is activated, and receives a first mixing signal during the remaining periods, the frequency of the first mixing signal is chosen to be such that its sum having the third carrier frequency corresponds to a frequency in conformity with the second carrier frequency, the frequency of the second mixing signal is chosen to be such that the difference between this frequency and the third carrier frequency corresponds to a frequency in conformity with the second carrier frequency, the phase relations between the color signal applied to the second mixer (20) and modulated on the third carrier frequency, the first mixing signal and the second mixing signal are chosen to be such that the chrominance information signal in the output signal of the second mixer (20) is modulated on the chrominance subcarrier with the desired phase position, and the output of the second mixer (20) is connected to a bandpass filter (35) which supplies, from its output, the color signal modulated on a chrominance subcarrier having the second carrier frequency.

13 Claims, 1 Drawing Sheet

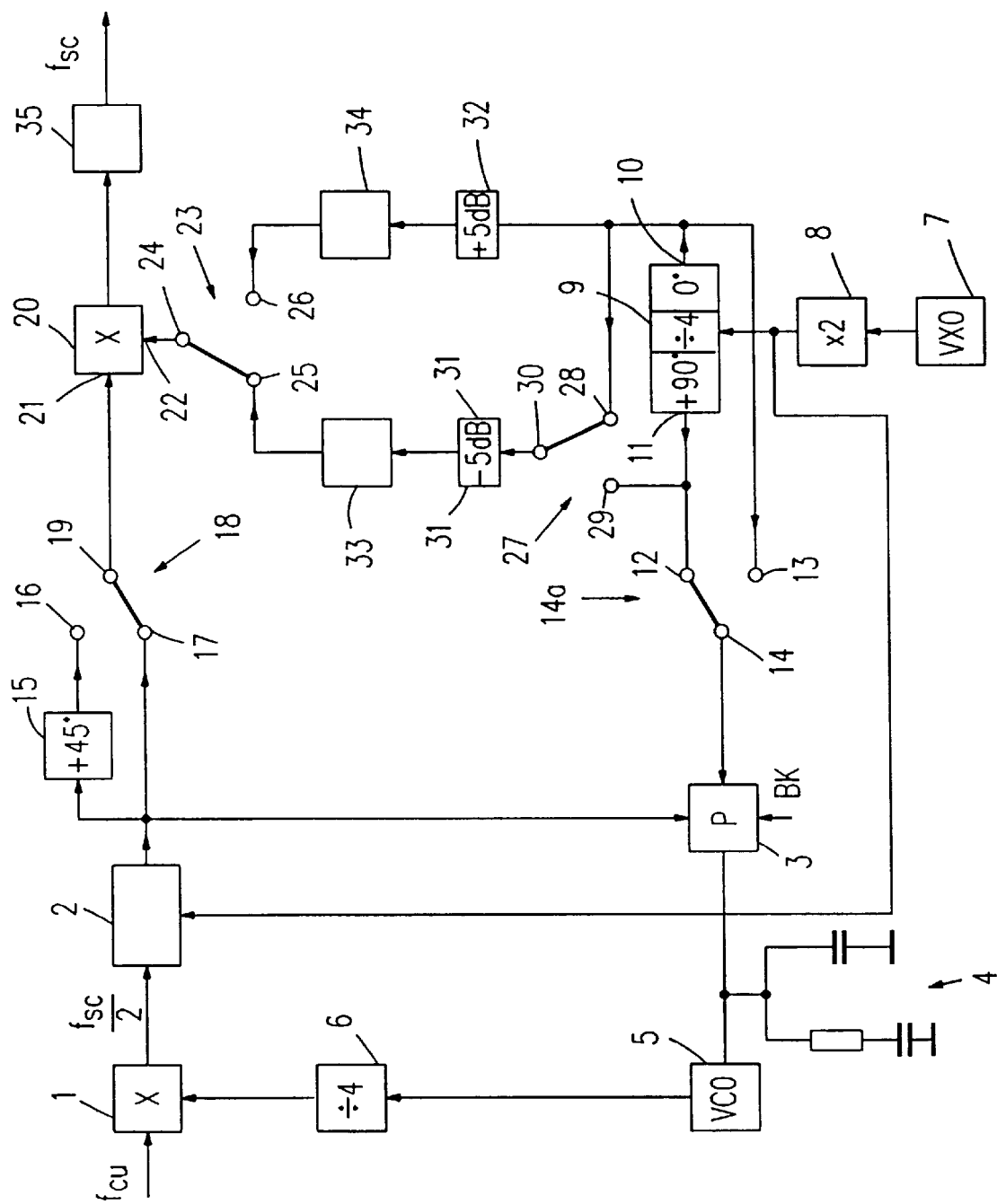

CIRCUIT ARRANGEMENT FOR FREQUENCY CONVERSION OF A COLOR SIGNAL

BACKGROUND OF THE INVENTION

1. Field of the Invention

The invention relates to a circuit arrangement for frequency conversion of a color signal to a second carrier frequency, this color signal being present in picture lines and comprising a color burst and a chrominance information signal modulated on a chrominance sub-carrier of the first carrier frequency, the circuit arrangement being switchable in a mode for conjugate-complex formation in which it generates an output signal in which, additionally to the frequency conversion, the color signal is present in a conjugate-complex form.

2. Description of the Related Art

The integrated circuit TDA 9726 marketed by Philips comprises such a circuit arrangement. This circuit arrangement has two mixers. The input signal, having a relatively low frequency of the chrominance subcarrier, is converted, by means of a mixer, to that chrominance subcarrier frequency which is provided for the relevant transmission standard. The first mixer precedes a comb filter. In its turn, this comb filter precedes a second mixer which is used for generating the conjugate-complex signal. This signal is required in a conjugate-complex formation mode for transcoding, for example, an NTSC signal into a PAL signal. This conjugate-complex signal is also required for a PAL signal whose PAL sequence is disturbed. In the known circuit arrangement, the change-over between the signal in its original phase position and the conjugate-complex signal is performed by a switch by means of which either the input signal or the output signal of the mixer is used alternately from picture line to picture line. This state-of-the-art circuit arrangement has the drawback that the carrier frequency, to which the color signal is converted by means of the first mixer, should always be the frequency which is supplied from the output of the circuit arrangement. This is necessary because the output switch alternately switches to the output signals of the first mixer and the second mixer. If the carrier frequency at the output of the second mixer is not the same as the frequency to be supplied from the output of the circuit arrangement, a third mixer would have to be arranged between the second mixer and the subsequent switch, which third mixer would then take care of the conversion to this frequency.

SUMMARY OF THE INVENTION

It is an object of the invention to improve the above-mentioned circuit arrangement in such a way that the carrier frequency to which the color signal is converted by means of the first mixer is selectable within predetermined limits, and that the circuit arrangement nevertheless requires a small number of components.

According to the invention, this object is solved in that the color signal modulated on the first carrier frequency is converted to a third carrier frequency by means of a first mixer, this third carrier frequency being higher than the first and lower than the second carrier frequency, a second mixer is provided by means of which the color signal having the third carrier frequency is converted to the second carrier frequency, the second mixer receives a second mixing signal during the periods when the conjugate-complex formation mode is activated, and receives a first mixing signal during the remaining periods, the frequency of the first mixing signal is chosen to be such that its sum having the third carrier frequency corresponds to a frequency in conformity with the second carrier frequency, the frequency of the second mixing signal is chosen to be such that the difference between this frequency and the third carrier frequency corresponds to a frequency in conformity with the second carrier frequency, the phase relations between the color signal applied to the second mixer and modulated on the third carrier frequency, the first mixing signal and the second mixing signal are chosen to be such that the chrominance information signal in the output signal of the second mixer is modulated on the chrominance subcarrier with the desired phase position, and the output of the second mixer is connected to a bandpass filter which supplies, from its output, the color signal modulated on a chrominance subcarrier having the second carrier frequency.

By means of the first mixer, the chrominance subcarrier frequency of the input signal is mixed up to a frequency which is above the chrominance subcarrier frequency of the input signal. This frequency is also below the frequency which is to be supplied from the output of the circuit arrangement and which is, for example, the frequency provided for the chrominance subcarrier frequency in conformity with the transmission standard of the color signal at the input. Thus, there is a relatively large range of values possible for the selection of the third carrier frequency to which the color signal at the input is converted by means of the first mixer.

Additionally, the second mixer is provided which serves two purposes. On the one hand, the chrominance subcarrier frequency of the signal applied to the second mixer, which frequency is determined by the mixing process in the first mixer, is converted by means of this second mixer to that chrominance subcarrier frequency which is to be supplied from the output of the circuit arrangement. On the other hand, if desired, the second mixer is simultaneously used for the purpose of generating a conjugate-complex signal. Due to this dual function of the second mixer, a third mixer is not needed, but would be required in the prior-art circuit if the chrominance subcarrier frequency at the output of the first mixer did not already correspond to the chrominance sub-carrier frequency to be supplied from the output of the circuit arrangement.

For this dual function, two mixing signals can be applied to the second mixer. A first mixing signal is selected as regards its frequency in such a way that the sum of the chrominance subcarrier frequency of the color signal applied to the input of the second mixer and the first mixing signal corresponds to the frequency of the second carrier frequency which is to be supplied from the output of the circuit arrangement. A second mixing signal is selected as regards its frequency in such a way that the difference between the frequency of the second mixing signal and the carrier frequency of the color signal applied to the second mixer is equal to the third carrier frequency, namely, that frequency which the carrier of the color signal should have and which is supplied from the output of the circuit arrangement. The phase relations between the color signal applied to the second mixer and the two mixing signals should then be considered and selected in such a way that, in the output signal of the mixer, the color signal is modulated on the chrominance subcarrier either in the original phase position or in the conjugate-complex phase position, dependent on the fact which mixing signal is applied to this mixer.

During those periods in which the second mixer receives the first mixing signal, only a frequency conversion takes place by means of the mixer. During these periods, the chrominance subcarrier of the third carrier frequency supplied by the first mixer is converted to the second carrier frequency. This mode may be used, for example, for processing a PAL signal whose PAL sequence is not disturbed. This also applies to an NTSC signal which is present at the input and should be made available again as an NTSC signal at the output.

In a conjugate-complex formation mode, the second mixing signal is applied to the mixer. Consequently, the output of the second mixer supplies a color signal which is modulated in a conjugate-complex phase position on the chrominance subcarrier of the third carrier frequency. This mode may therefore be additionally used for transcoding, for example, an NTSC signal applied to the input into a PAL signal. This mode may also be used for correcting a PAL signal whose PAL sequence is disturbed, ie, for restoring a correct PAL sequence. If an NTSC signal is to be transcoded into a PAL signal, the circuit arrangement should be line-alternately set to the normal mode and to the conjugate-complex mode. Then, a color signal is generated during every second line, in which the chrominance subcarrier of the third carrier frequency is modulated in a conjugate-complex phase position on this signal. During the remaining periods, the phase position of the color signal is not influenced. A transcoding of the NTSC signal into a PAL signal has then been performed. If the PAL sequence is disturbed in a PAL signal, the circuit arrangement is set each time to the other mode at each disturbance. Thus, it is set from the normal mode to the conjugate-complex mode, or conversely. Consequently, the PAL sequence can be corrected at every switch-over between the two modes. At every disturbance of the PAL sequence, there is a one-time switch-over between the two modes. At the next disturbance, such a switch-over follows again.

The circuit arrangement thus has the advantage that it finds a wide universal use because of the free selection of the carrier frequency of the output signal from the first mixer. For example, filters which are additionally arranged between the first and the second mixer can operate at the relevant desired frequency. Due to the dual function of the second mixer, a third mixer is not required. Moreover, the second mixer is used both for frequency conversion and for conjugate-complex formation. This reduces the number of components.

The prior-art circuit would require three mixers for such a function. A further practical drawback is that, in the prior art, a further low-pass filter would be required behind the third mixer then to be provided. This is a great drawback because it would lead to a further signal delay in the color signal. The luminance signal parallel processed in another branch would then also have to be delayed. However, such delays can only be realized with great difficulty or at a high cost, particularly in integrated circuits. The relatively small signal delay of the circuit arrangement according to the invention is therefore very advantageous.

An embodiment of the invention is characterized in that the third carrier frequency is equal to half the second carrier frequency, and the color signal applied to the second mixer and modulated on the third carrier frequency is present with a phase position $$\cos\left(\frac{\omega t}{2} + \varphi + \gamma\right)$$

the first mixing signal is present with a phase position $$\sin\left(\frac{\omega t}{2} + \alpha\right)$$

and the second mixing signal is present with the phase position $$\sin\left(\frac{3\omega t}{2} + \beta\right)$$

while it holds that $\alpha - \beta + 2\gamma = 0$
and in which $\phi$ is the useful phase position comprising the chrominance information and $\omega$ is the second chrominance subcarrier frequency and $\alpha, \beta, \gamma$ are further phase shifts generated by the circuit arrangement, and the first mixing signal has a frequency corresponding to the third carrier frequency and the second mixing signal has a frequency corresponding to the threefold third carrier frequency.

In accordance with this advantageous embodiment, the chrominance subcarrier frequency of the color signal applied to the input of the circuit arrangement is mixed by means of the first mixer, to half the nominal output frequency of the carrier. If the second carrier frequency of the signal at the output is the frequency in accordance with the transmission standard, then, in accordance with this advantageous embodiment, the first mixer converts the signal applied to the input of the circuit arrangement to a carrier frequency which amounts to half the frequency of this output frequency. In this case, the first mixing signal has a frequency corresponding to the third carrier frequency, and the second mixing signal has a frequency which is three times the third carrier frequency. Moreover, the above-mentioned phase relations should be maintained.

In a further embodiment of the invention, the color signal applied to the circuit arrangement is a reproducing signal for a video recorder, and the first mixer precedes a comb filter which filters the unwanted signal components in the color signal applied thereto, particularly crosstalk signals originating from neighboring tracks of a video tape played on a video recorder.

If the circuit arrangement, according to the invention, is used in a video recorder, the color signal applied to the input of the circuit arrangement is modulated on the so-called color-under carrier-frequency at which the color signal is recorded on the tape. The color signal is converted from this frequency to a higher carrier frequency by means of the first mixer. The comb filter also operates at this frequency and the number of components of this filter can be maintained relatively small because, unlike the prior-art circuit, the comb filter operates at a frequency which is lower than the second carrier frequency. The number of components in the comb filter is reduced thereby. Only behind the comb filter is the carrier frequency raised to the second carrier frequency. This is realized by means of the second mixer which may be simultaneously used for transcoding.

In accordance with a further embodiment of the invention, a signal generator and a subsequent divider circuit are provided, which supplies a substantially squarewave-shaped signal comprising, inter alia, the frequency components of the first and the second mixing signal and being applied to a first filter by means of which the frequency components of the second mixing signal are suppressed and which supplies the first mixing signal from its output, and being applied to a second filter by means of which the frequency components of the first mixing signal are suppressed and which supplies the second mixing signal from its output.

The frequencies of the first and second mixing signals may be advantageously generated by means of such a signal generator whose output signal has a spectrum comprising the required frequency components. For example, if the third chrominance subcarrier frequency is equal to half the second chrominance subcarrier frequency, the frequency components in conformity with the third chrominance subcarrier frequency and the threefold chrominance subcarrier frequency are required from the square-wave signal. These frequencies are present in a square-wave signal anyway. Therefore, a first filter is provided which suppresses the frequency components of the threefold frequency of the third carrier frequency and thus supplies from its output preferably the frequency components having the single frequency of the third carrier frequency. Furthermore, a second filter is provided which, conversely, suppresses the frequency components having the single third carrier frequency and supplies from its output, inter alia, the frequency components having the threefold third carrier frequency. The output signals of these two filters are used as mixing signals for the second mixer.

If necessary, these filters may be additionally used for the purpose of adjusting the desired phase relations between the two mixing signals and the color signal applied to the input of the second mixer, which color signal is modulated on the carrier having the third carrier frequency. A further embodiment of the invention is therefore characterized in that the first filter shifts the phase position of the frequency components of the first mixing signal by −45° and the second filter shifts the phase position of the frequency components of the third mixing signal by +45°.

The different frequency components in the square-wave signal have different amplitudes. As a result, the two mixing signals also have different amplitudes. Since this is undesirable, a further embodiment of the invention is characterized in that the circuit arrangement comprises means for compensating the frequency component amplitudes of different values. These means may be implemented, for example in such a way that the output signals of the two filters are applied to amplifiers and/or attenuators which supply the two mixing signals with the same amplitude from their outputs.

According to the invention, an advantageous embodiment also provides the possibility that the bandpass filter precedes an amplifier having a switchable amplification, which in the conjugate-complex mode compensates the different amplitude values of the output signal of the bandpass filter, which values occur in dependence upon the fact whether the first or the second mixing signal is applied to the second mixer.

To generate the desired frequencies of the first and the second mixing signal, and to generate the desired phase position between the mixing signals and the carrier frequency of the color signal applied to the second mixer, a further embodiment of the invention is characterized in that the signal generator supplies a square-wave signal having a fundamental frequency corresponding to the second carrier frequency whose frequency is doubled by means of a multiplier whose output signal is applied to a divider circuit, a first output of which supplies an output signal divided by four, without a phase shift, which output signal is applied to the first filter and, dependent on the mode and color standard of the color signal, to the second filter, and a second output of which supplies an output signal which is divided by four and is phase-shifted by +90° with respect to the output signal at the first output, and is used for a phase comparator whose output signal is used for generating a mixing signal for the first mixer.

Such a digital divider circuit can be realized with a very small number of components. It has the additional advantage that the two outputs with 0° and 90° phase position in the divider circuit can be easily realized. Such a divider can also be used in a simple way for generating the desired phase relations, particularly for the mixing signal. Unlike the prior-art circuit, a separate phase shifter is not required for this purpose.

These and other aspects of the invention are apparent from and will be elucidated with reference to the embodiments described hereinafter.

BRIEF DESCRIPTION OF THE DRAWING

The sole FIGURE is a block diagram of an embodiment of a circuit arrangement according to the invention.

DESCRIPTION OF THE PREFERRED EMBODIMENTS

The sole FIGURE is a block diagram of an embodiment of the circuit arrangement according to the invention, whose input receives a color signal which is modulated on a relatively low carrier frequency. Moreover, this signal comprises a color burst which, at the start of each picture line, indicates the nominal phase position of the color signal. This carrier frequency may be, for example, the color-under carrier-frequency of a color signal with which such a signal is recorded on, and read from, a video recorder tape.

The circuit arrangement supplies this signal from its output in a form converted to a second carrier frequency. This carrier frequency may be, for example, the frequency required for the color signal in accordance with the transmission standard. For PAL color signals, this frequency is, for example, 4.4 . . . MHz. This signal is denoted by $f_{sc}$ in the FIGURE.

In addition to this frequency conversion, the circuit arrangement shown in the FIGURE may also be used for generating a color signal in the original phase position and in the conjugate-complex phase position alternately from picture line to picture line.

The color signal applied to the input of the circuit arrangement and modulated on the chrominance subcarrier having the color-under carrier-frequency is applied to a first mixer 1. By means of the first mixer 1, the chrominance subcarrier frequency is converted to a third chrominance subcarrier frequency which, in this embodiment, corresponds to half the chrominance subcarrier frequency of output signal $f_{sc}$. The output signal of the first mixer is applied to a comb filter 2. The number of components for this comb filter 2 is relatively small because it does not operate at the frequency of the output signal $f_{sc}$ but only at half the frequency. The comb filter 2 may be used, for example, for suppressing color signal components of crosstalk signals from neighboring tracks when the signal $f_{cu}$ is read from the video tape.

The output signal of the comb filter 2 is applied, inter alia, to a phase comparator 3. The phase comparator 3 is clocked with a signal BK. This is a burst-key signal which is active only during the periods when the color burst is transmitted.

The output of the phase comparator 3 is coupled to a filter 4 adjusting the desired phase and frequency behavior of the control loop. This signal coupled to the filter 4 is applied to a voltage-controlled oscillator 5 whose output signal is divided down by means of a divider 6. The output of the divider 6 supplies a signal having the frequency $$\frac{f_{sc}}{2} + f_{cu}$$

As a result, the output signal of the first mixer has the frequency $$\frac{f_{sc}}{2}$$

The phase comparator 3 also receives an input signal which is derived from the output signal of a quartz oscillator 7. The output signal of this quartz oscillator is first raised to the double frequency by means of a multiplier 8. The output signal of this multiplier 8 is used for clocking the comb filter 2 and is applied to a divider 9. This divider 9 divides the signal by 4 and supplies this signal with an unchanged phase position at the first output 10. At a second output 11, this signal is made available with a phase position of +90°. The output signal of the second output 11 is applied to a first input contact 12 of a switch 14a. The output signal of the first output 10 of the divider circuit 9 is applied to a second input contact 13 of the switch 14a. The output contact 14 of the switch 14a is coupled to a second input of the phase comparator 3. If the signal $f_{cu}$ is a PAL signal, the switch 14a may be used for shifting the comparison signal applied to the phase comparator by 90° from picture line to picture line. The two burst signals applied to the phase comparator 3 then have the same phase jumps from picture line to picture line. This has the advantage that, in spite of these phase jumps, the phase comparator 3 supplies a constant signal from its output. The phase-locked loop constituted by the phase comparator 3, the loop filter 4, the voltage-controlled oscillator 5, the divider 6 and the first mixer 1 then operates without frequency or phase jumps, also when a PAL signal is used.

The output signal of the comb filter 2 is applied to a phase shifter 15 which gives this signal a phase shift of +45°. The output signal of the phase shifter 15 is applied to a first input contact 16 of a switch 18.

The output signal of the comb filter 2 is further applied to a second input contact 17 of the switch 18. An output contact 19 of the switch 18 is connected to a first input 21 of a second mixer 20.

A second input 22 of the second mixer 20 is connected to an output contact 24 of a switch 23. The switch 23 has a first input contact 25 and a second input contact 26. The first mixing signal is applied to the first input contact 25 of the switch 23 and the second mixing signal is applied to the second input contact 26 of this switch.

These mixing signals are derived from the output signals of the divider circuit 9 which provides these signals at the outputs 10 and 11. To this end, the second output 11 of the divider circuit 9 is coupled to a first input contact 29 of a switch 27. The first output 10 of the divider circuit 9 is coupled to a second input contact 28 of the switch 27. The output contact 30 of the switch 27 is connected to an attenuator 31 which precedes a first filter 33 whose output signal is coupled to the first input contact 25 of the switch 23.

The output signal of the first output 10 of the divider circuit 9 is applied to an amplifier 32 whose output signal is applied to a second filter 34 whose output is connected to the second input contact 26 of the switch 23.

The phase relation between the two mixing signals can be adjusted in the desired manner by means of the switch 27. A switch-over between the first and the second mixing signal is performed by means of the switch 23.

Both mixing signals are derived from the output signals of the divider circuit 9 and comprise a spectrum of frequency components. In the embodiment shown in the FIGURE, the carrier frequency of the color signal applied to the first input 21 of the second mixer 20 is $$\frac{f_{sc}}{2}$$

The first mixing signal should then also have this frequency and the second mixing signal should have the threefold frequency. These frequency components are comprised in the output signals of the divider circuit 9. To filter the desired frequency components or to suppress the unwanted frequency components, the first filter 33 and the second filter 34 are provided. The first filter 33 is implemented in such a way that it suppresses the frequency components in conformity with $$3\frac{f_{sc}}{2}$$

and phase-shifts the frequency component $$\frac{f_{sc}}{2}$$

−45°. This is achieved by means of a filter having a quality Q=3/8.

The second filter 34 has also a quality of Q=3/8 and, with priority, suppresses the frequency $$\frac{f_{sc}}{2}$$

The frequency $$3\frac{f_{sc}}{2},$$

which the filter supplies as the useful frequency from its output, is phase-shifted by +45°. The first and the second mixing signal are then available with the required frequencies at the inputs 25 and 26, respectively. In the conjugate-complex mode, the switch 23 is set to position 26. If the switch is in position 25, the frequency of the color signal applied to the input 21 of the second mixer 20 at the carrier frequency of $$\frac{f_{sc}}{2}$$

is converted to the carrier frequency $f_{sc}$. In addition to this frequency component, further components are comprised in the output signal of the second mixer 20, and for this reason the second mixer 20 precedes a bandpass filter 35 which supplies only the signal component of the carrier frequency $f_{sc}$ from its output.

During the periods when the switch 23 is switched to its second input 26, the second input 22 of the second mixer 20 receives the second mixing signal of the frequency $$3\frac{f_{sc}}{2}$$

By mixing with the signal of the frequency $$\frac{f_{sc}}{2}$$

inter alia, a signal of the frequency $f_{sc}$ is produced, but this signal is in the conjugate-complex phase position. Then, both a frequency conversion to the frequency $f_{sc}$ has taken place and, simultaneously, a conjugate-complex signal has been generated.

If the input signal $f_{cu}$ is, for example, an NTSC signal and if this signal should not only be frequency-converted to the chrominance subcarrier frequency in conformity with the transmission standard but also transcoded into a color signal of the PAL standard, then the switch 23 is switched from picture line to picture line so that a signal is line-alternately generated in its original phase position and in the conjugate-complex phase position. This mode may also be used for a PAL signal whose PAL sequence is temporarily disturbed. During such disturbances, the correct PAL sequence is restored also by switching the switch 23. At each disturbance of the PAL sequence, the switch 23 is then switched to the relevant other position. It remains in this position as long as subsequently the PAL sequence is undisturbed. At the next disturbance of the PAL sequence, the switch is again switched to the relevant other position.

If such a transcoding is not to take place, for example, because an NTSC signal applied to the input should also be supplied as such, or because a PAL signal applied to the input has an undisturbed PAL sequence, then the switch 23 remains in its position 25 so that the second mixer 20 performs a frequency conversion only.

In addition to these frequency conditions, hitherto explained, of the color signal applied to the input 21 of the second mixer 20 and of the mixing signals applied to its second input 22, mutual phase relations between these three signals should also be considered.

As already explained above, the first filter 33 shifts the phase by −45° and the second filter 34 shifts the phase by +45°. The first mixing signal then has a phase position of $$\sin\left(\frac{\omega t}{2} + \alpha\right)$$

and the second mixing signal has a phase position of $$\sin\left(\frac{3\omega t}{2} + \beta\right)$$

in which $\alpha=-45°$ and $\beta=+45°$. If the phase position of the color signal applied to the first input of the mixer 20, or its chrominance subcarrier is $$\cos\left(\frac{\omega t}{2} + \varphi + \gamma\right)$$

then it should hold for the phase angles $\alpha$, $\beta$ and $\gamma$ that:

$\alpha-\beta+2\gamma=0$

In this case, $\varphi$ is the useful phase angle of the color signal, thus the phase angle which in relation to the color burst transmits the useful signal, namely the chrominance information. The angle $\gamma$ is a further phase angle generated in the circuit arrangement.

These phase conditions will hereinafter be elucidated with reference to three operating conditions.

First, it is assumed that an NTSC signal applied to the input should also be made available as such at the output, but in a converted frequency position.

Secondly, a PAL signal applied to the input is made available as a PAL signal again at the output, while the PAL sequence is temporarily corrected.

Thirdly, an NTSC signal applied to the input is not only converted in frequency but also transcoded into a PAL signal.

In the case of an NTSC signal applied to the input and made available as such at the output in the standard frequency of the chrominance subcarrier, the switch 14a is connected to its input 13. The signal applied to the first input 21 of the mixer 20 then has a phase position of $$\cos\left(\frac{\omega t}{2} + \varphi + \gamma\right)$$

in which $\gamma=0$. The switch 27 is connected to its first input 29 so that the signal applied to the first filter 33 is shifted +90° in phase. Since the first filter 33 provides the signal applied thereto with a phase shift of −45°, the output signal of the first filter 33 has an overall phase shift of +45°. In the above-mentioned equations, $\alpha$ is then 45°. In a corresponding manner, it invariably holds for the output signal of the second filter 34 that it has a phase shift of 45°. Thus it holds that $\beta=45°$. The above-mentioned equation is thereby satisfied for such an NTSC signal. In this case, the phase position of the second mixing signal supplied by the second filter 34 does not play a role because the switch 23 remains in its position 25 as long as the NTSC signal is not to be transcoded.

If the NTSC signal fu at the output is to be transcoded, the color burst is shifted by 45° by means of the switch 18. This is realized by connecting the switch 18 to its input 16 during the color burst. During the remaining periods, the switch 18 is connected to its input 17. This switch-over is also effected to generate the color burst in the output signal of the circuit arrangement in the phase position in accordance with the PAL standard.

However, for the transcoding process of the NTSC signal, the switch 23 is now switched alternately to positions 25 and 26 from picture line to picture line, so that the signal applied to the first input 21 of the second mixer is alternately mixed with the first and the second mixing signal. In the manner described above, an output signal $f_{sc}$ is thereby alternately generated from picture line to picture line, which output signal is line-alternately present in its original phase position and in the conjugate-complex phase position. As a result, the NTSC signal is transcoded into a PAL signal.

If the signal $f_{cu}$ present at the input at the lower carrier frequency is a PAL signal which is to be converted to its chrominance subcarrier frequency in conformity with the standard, then the switch 14a is switched alternately to positions 12 and 13 from picture line to picture line, as already explained above, so as to compensate for the burst phase jumps of ±45° for the mixing signal from the first mixer 1.

Moreover, the switch 27 is switched to the position 28 so that both filters 33 and 34 receive input signals of the same phase position. Then, $\alpha=-45°$ in the above-mentioned equations based on the phase shift of −45° of the first filter 33.

As before, the value β of the second filter 34 is +45°. In the above-mentioned equation α−β+γ=0, γ should have the value of +45°. This is actually the case because a phase shift of +45° occurs on average between an input signal of 0° and +90° due to the line-alternate switching of the switch 14a. This phase shift is generated in the phase-locked loop constituted by the phase comparator 3, the loop filter 4, the voltage-controlled oscillator 5, the divider 6 and the mixer 1. As a result, the phase position of the color signal applied to the first input 21 of the second mixer 20, or its chrominance subcarrier, is $$\cos\left(\frac{\omega t}{2} + \varphi + \gamma\right)$$

in which γ is +45°. The above-mentioned equation is thereby satisfied, so that the desired output signals are generated by means of the second mixer 20.

As long as the PAL sequence of the signal $f_{cu}$ is undisturbed, the switch 23 remains connected to its first input 25 so that mixing with the first mixing signal takes place in the second mixer 20. In this case, the signal $f_{cu}$ is converted to the frequency $_{sc}$. For example, if the PAL sequence of the input signal is disturbed, the switch 23 is switched to the relevant other position at each disturbance. If the PAL sequence is subsequently undisturbed, the switch will remain in this position. At the next disturbance, the switch will again be changed over to the relevant other position.

In summary, the desired frequency conversion and, if required, a generation of a conjugate-complex signal either for transcoding or for correcting the PAL sequence is achieved with a simple structure of the circuit arrangement according to the invention.

We claim:

1. A circuit arrangement for frequency conversion of a color signal to a second carrier frequency, said color signal being present in picture lines and comprising a color burst signal and a chrominance information signal modulated on a chrominance sub-carrier of a first carrier frequency, the circuit arrangement being switchable in a mode for conjugate-complex formation in which the circuit arrangement generates an output signal in which, in addition to the frequency conversion, the color signal is present in a conjugate-complex form, characterized in that the circuit arrangement comprises:
    a first mixer for converting the color signal modulated on the first carrier frequency to a third carrier frequency, said third carrier frequency being higher than the first carrier frequency and lower than the second carrier frequency; and
    a second mixer for converting the color signal having the third carrier frequency to the second carrier frequency, the second mixer having an input for receiving a second mixing signal when the conjugate-complex formation mode of the circuit arrangement is activated, said input receiving a first mixing signal when said circuit arrangement is not in said conjugate-complex formation mode, wherein:
        a frequency of the first mixing signal is chosen such that a sum of the first mixing signal frequency and the third carrier frequency corresponds to a frequency in conformity with the second carrier frequency;
        a frequency of the second mixing signal is chosen such that a difference between the second mixing signal frequency and the third carrier frequency corresponds to a frequency in conformity with the second carrier frequency; and
        the phase relations between the color signal applied to the second mixer and modulated on the third carrier frequency, the first mixing signal and the second mixing signal are chosen such that the chrominance information signal in the output signal of the second mixer is modulated on the chrominance subcarrier with the desired phase position, said circuit arrangement further comprising:
    a bandpass filter coupled to an output of the second mixer, said bandpass filter supplying, at an output, the color signal modulated on a chrominance subcarrier having the second carrier frequency.

2. A circuit arrangement as claimed in claim 1, characterized in that the third carrier frequency is equal to half the second carrier frequency, and the color signal applied to the second mixer and modulated on the third carrier frequency, is present with a phase position $$\cos\left(\frac{\omega t}{2} + \varphi + \gamma\right)$$

the first mixing signal is present with a phase position $$\sin\left(\frac{\omega t}{2} + \alpha\right)$$

and the second mixing signal is present with the phase position $$\sin\left(\frac{3\omega t}{2} + \beta\right)$$

while it holds that α−β+2γ=0,
    and in which φ is the useful phase position comprising the chrominance information, and ω is the second chrominance subcarrier frequency, and α, β, γ are further phase shifts generated by the circuit arrangement, and the first mixing signal has a frequency corresponding to the third carrier frequency and the second mixing signal has a frequency corresponding to the threefold third carrier frequency.

3. A circuit arrangement as claimed in claim 1, characterized in that the color signal applied to the circuit arrangement is a reproducing signal for a video recorder, and the first mixer precedes a comb filter which filters unwanted signal components in the color signal applied thereto, said unwanted signal components comprising crosstalk signals originating from neighboring tracks of a video tape played on a video recorder.

4. A circuit arrangement as claimed in claim 1, characterized in that said circuit arrangement further comprises:
    a signal generator and a subsequent divider circuit for supplying a substantially squarewave-shaped signal comprising, inter alia, the frequency components of the first mixing signal and the second mixing signal;
    a first filter coupled to an output of said divider circuit for suppressing the frequency components of the second mixing signal and for supplying, at an output, the first mixing signal; and
    a second filter also coupled to the output of said divider circuit for suppressing the frequency components of the first mixing signal and for supplying, at an output, the second mixing signal.

5. A circuit arrangement as claimed in claim 4, characterized in that the first filter shifts the phase position of the frequency components of the first mixing signal by −45° and the second filter shifts the phase position of the frequency components of the second mixing signal by +45°.

6. A circuit arrangement as claimed in claim 4, characterized in that said circuit arrangement further comprises means for compensating for frequency component amplitudes of different values.

7. A circuit arrangement as claimed in claim 6, characterized in that the circuit arrangement further comprises, at an output of the bandpass filter, an amplifier having a switchable amplification, said amplifier, in the conjugate-complex mode, compensating for different amplitude values of the output signal of the bandpass filter, said different amplitude values occurring in dependence upon whether the first mixing signal or the second mixing signal is applied to the second mixer.

8. A circuit arrangement as claimed in claim 4, characterized in that said circuit arrangement comprises a first switch for receiving the output signals of the first and second filters, said first switch supplying, in the conjugate-complex mode, second mixing signal at the output of said second filter to the second mixer, and said first switch supplying the first mixing signal at the output of said first filter to the second mixer during the remaining periods.

9. A circuit arrangement as claimed in claim 4, characterized in that said circuit arrangement further comprises a multiplier coupled to an output of the signal generator which supplies a square-wave signal having a fundamental frequency corresponding to the second carrier frequency, said multiplier doubling the fundamental frequency of the signal generator, and having an output coupled to an input of the divider circuit, said divider circuit having a first output for supplying a first output signal corresponding said doubled fundamental frequency divided by four without a phase shift, said first output signal being applied to the first filter and, dependent on the mode and color standard of the color signal, to the second filter, and a second output for supplying a second output signal corresponding to said doubled fundamental frequency divided by four and phase-shifted by +90° with respect to the first output signal at the first output, said second output signal being applied to a phase comparator having an output signal for generating a mixing signal for the first mixer.

10. A circuit arrangement as claimed in claim 1, characterized in that the color signal applied to the circuit arrangement is a signal of the PAL standard in which, at least temporarily, an alternating phase position of the color signal is disturbed, said circuit arrangement comprising means for alternately switching on and off the conjugate-complex mode during these periods.

11. A circuit arrangement as claimed in claim 1, characterized in that, for processing an NTSC signal, the first mixing signal is applied to the second mixer and the circuit arrangement is not set to the conjugate-complex mode.

12. A circuit arrangement as claimed in claim 1, characterized in that the color signal applied to the circuit arrangement is a signal of the NTSC standard, and, for transcoding said signal to the PAL standard, the circuit arrangement is line-alternately set to the conjugate-complex mode during every second picture line.

13. A video recorder comprising a circuit arrangement for frequency conversion of a color signal to a second carrier frequency, said color signal being present in picture lines and comprising a color burst signal and a chrominance information signal modulated on a chrominance sub-carrier of a first carrier frequency, the circuit arrangement being switchable in a mode for conjugate-complex formation in which the circuit arrangement generates an output signal in which, in addition to the frequency conversion, the color signal is present in a conjugate-complex form, characterized in that the circuit arrangement comprises:

a first mixer for converting the color signal modulated on the first carrier frequency to a third carrier frequency, said third carrier frequency being higher than the first carrier frequency and lower than the second carrier frequency, and a second mixer for converting the color signal having the third carrier frequency to the second carrier frequency, the second mixer having an input for receiving a second mixing signal when the conjugate-complex formation mode of the circuit arrangement is activated, said input receiving a first mixing signal when said circuit arrangement is not in said conjugate-complex formation mode, wherein:

a frequency of the first mixing signal is chosen such that a sum of the first mixing signal frequency and the third carrier frequency corresponds to a frequency in conformity with the second carrier frequency;

a frequency of the second mixing signal is chosen such that a difference between the second mixing signal frequency and the third carrier frequency corresponds to a frequency in conformity with the second carrier frequency; and the phase relations between the color signal applied to the second mixer and modulated on the third carrier frequency, the first mixing signal and the second mixing signal are chosen such that the chrominance information signal in the output signal of the second mixer is modulated on the chrominance subcarrier with the desired phase position, said circuit arrangement further comprising:

a bandpass filter coupled to an output of the second mixer, said bandpass filter supplying, at an output, the color signal modulated on a chrominance sub-carrier having the second carrier frequency, in which the color signal applied to the circuit arrangement is modulated on a carrier in color-under carrier-frequency in a form reproduced and possibly amplified by means of a video tape, and is converted to the second carrier frequency by the circuit arrangement, said circuit arrangement generating a line-alternating conjugate-complex signal when set to the conjugate-complex mode.

* * * * *